US011514335B2

(12) United States Patent
Marascu et al.

(10) Patent No.: US 11,514,335 B2
(45) Date of Patent: Nov. 29, 2022

(54) ROOT CAUSE IDENTIFICATION IN AUDIT DATA

(71) Applicant: INTERNATIONAL BUSINESS MACHINES CORPORATION, Armonk, NY (US)

(72) Inventors: Alice-Maria Marascu, Dublin (IE); Radu Marinescu, Dublin (IE); Bogdan E. Sacaleanu, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 745 days.

(21) Appl. No.: 15/275,594

(22) Filed: Sep. 26, 2016

(65) Prior Publication Data

US 2018/0089567 A1 Mar. 29, 2018

(51) Int. Cl.
*G06N 5/02* (2006.01)
*G06N 7/00* (2006.01)
*G06N 5/04* (2006.01)

(52) U.S. Cl.
CPC ............. *G06N 5/022* (2013.01); *G06N 5/045* (2013.01); *G06N 7/005* (2013.01)

(58) Field of Classification Search
CPC ......... G06N 5/045; G06N 5/022; G06N 7/005
See application file for complete search history.

(56) References Cited

U.S. PATENT DOCUMENTS

| 5,442,778 | A | * | 8/1995 | Pedersen | G06F 16/93 707/999.005 |
| 5,717,835 | A | * | 2/1998 | Hellerstein | G06N 5/02 706/46 |
| 7,447,650 | B1 | | 11/2008 | Gutierrez et al. | |
| 8,082,337 | B1 | | 12/2011 | Davis et al. | |
| 8,156,377 | B2 | | 4/2012 | Li et al. | |
| 8,818,795 | B1 | * | 8/2014 | Cassimatis | G06F 17/2785 704/9 |
| 2003/0140063 | A1 | * | 7/2003 | Pizzorno | G16H 50/20 |
| 2005/0114829 | A1 | | 5/2005 | Robin et al. | |
| 2008/0109212 | A1 | * | 5/2008 | Witbrock | G06F 17/2785 704/9 |
| 2008/0154679 | A1 | | 6/2008 | Wade | |
| 2008/0281768 | A1 | * | 11/2008 | Sadeh | G06Q 10/10 706/47 |

(Continued)

OTHER PUBLICATIONS

Brigitte Jaumard et al., First Order Probabilistic Logic, 2006, IEEE. (Year: 2006).*

(Continued)

*Primary Examiner* — Alexey Shmatov
*Assistant Examiner* — Beatriz Ramirez Bravo
(74) *Attorney, Agent, or Firm* — Griffiths & Seaton PLLC

(57) ABSTRACT

Embodiments for cause identification in audit data by a processor. A probabilistic logical representation is extracted from text data representing a knowledge domain according to an ontology to identify one or more reoccurring problems of the knowledge domain. A root cause and one or more causal factors of the one or more reoccurring problems is automatically identified using the logical representation such that the identifying associates a confidence level for the root cause and the one or more causal factors.

15 Claims, 6 Drawing Sheets

(56) References Cited

U.S. PATENT DOCUMENTS

| | | | | |
|---|---|---|---|---|
| 2009/0182755 | A1* | 7/2009 | Adair | G06F 16/285 |
| | | | | 707/E17.046 |
| 2010/0050023 | A1* | 2/2010 | Scarpelli | G06F 11/0709 |
| | | | | 714/46 |
| 2012/0102543 | A1 | 4/2012 | Kohli et al. | |
| 2012/0166623 | A1* | 6/2012 | Suit | G06F 11/3006 |
| | | | | 709/224 |
| 2013/0110747 | A1* | 5/2013 | Richardson | G06N 20/00 |
| | | | | 706/12 |
| 2013/0144812 | A1* | 6/2013 | Chaganty | G06N 7/005 |
| | | | | 706/12 |
| 2013/0231920 | A1* | 9/2013 | Mathew | G06F 40/40 |
| | | | | 704/9 |
| 2014/0310230 | A1 | 10/2014 | Cinelli et al. | |
| 2014/0379537 | A1 | 12/2014 | Canis et al. | |
| 2015/0294249 | A1* | 10/2015 | Kaya | G06Q 10/0635 |
| | | | | 705/7.28 |
| 2016/0085743 | A1* | 3/2016 | Haley | G06F 17/28 |
| | | | | 704/9 |
| 2016/0217393 | A1* | 7/2016 | Yu | G06N 20/00 |
| 2016/0247090 | A1* | 8/2016 | Yu | G06F 17/2785 |
| 2017/0024652 | A1* | 1/2017 | Kipersztok | G06N 7/005 |
| 2017/0103329 | A1* | 4/2017 | Reddy | G06N 5/04 |
| 2017/0286199 | A1* | 10/2017 | Soini | G06F 11/079 |
| 2018/0018355 | A1* | 1/2018 | Toivanen | G06F 16/30 |
| 2018/0018573 | A1* | 1/2018 | Henderson | G06N 5/046 |
| 2018/0181899 | A1* | 6/2018 | Raghavan | G06Q 10/04 |

OTHER PUBLICATIONS

Hsham Assal et al., Semantically-Enhanced Information Extraction, 2011, IEEE. (Year: 2011).*

Stuart Russell et al., First-Order Probabilistic Models for Information Extraction, 2003, In Proc. IJCAI-03, Workshop on Learning Statistical Models from Relational Data. (Year: 2003).*

Elgammal et al., "Root-Cause Analysis and Design-Time Compliance Violations on the Basis of Property Patterns", Springer, 2010. (Year: 2010).*

Elgammal et al., "Formalizing and applying compliance patterns for business process", Springer 2014. (Year: 2014).*

Sharp et al., "Toward Semi-Autonomous Information Extraction for Unstructured Maintenance Data in Root Cause Analysis", National Institute of Standards and Technology, Sep. 7, 2016. (Year: 2016).*

Elgammal et al., "Formalizing and appling compliance patterns for business process compliance", Springer, Feb. 2014. (Year: 2014).*

Turetken et al., "Capturing Compliance Requirements: A Pattern-Based Approach", Focus: Software Engineering for Compliance, (2012). (Year: 2012).*

* cited by examiner

ROOT CAUSE IDENTIFICATION IN AUDIT DATA

BACKGROUND OF THE INVENTION

Field of the Invention

The present invention relates in general to computing systems, and more particularly to, various embodiments for targeted learning and recruitment using a computing processor.

Description of the Related Art

Computing systems may be found in the workplace, at home, or at school. Computer systems may include data storage systems, or disk storage systems, to process and store data. Large amounts of data have to be processed daily and the current trend suggests that these amounts will continue being ever-increasing in the foreseeable future. Due to the recent advancement of information technology and the growing popularity of the Internet, a vast amount of information is now available in digital form. Such availability of information has provided many opportunities. Digital and online information is an advantageous source of business intelligence that is crucial to an entities survival and adaptability in a highly competitive environment. Also, many businesses and organizations, such as financial institutions, employing the use of computing systems and online data must ensure operations, practices, and/or procedures are in compliance with general business protocols, corporate compliance, legal regulations or policies, and/or financial requirements.

SUMMARY OF THE INVENTION

Various embodiments for root cause identification in audit data by a processor, are provided. In one embodiment, by way of example only, a method for root cause identification in audit data, again by a processor, is provided. A probabilistic logic representation is extracted from text data representing a knowledge domain according to an ontology to identify one or more reoccurring problems of the knowledge domain. A root cause and one or more causal factors of the one or more reoccurring problems is automatically identified using the logical representation such that the identifying associates a confidence level for the root cause and the one or more causal factors.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
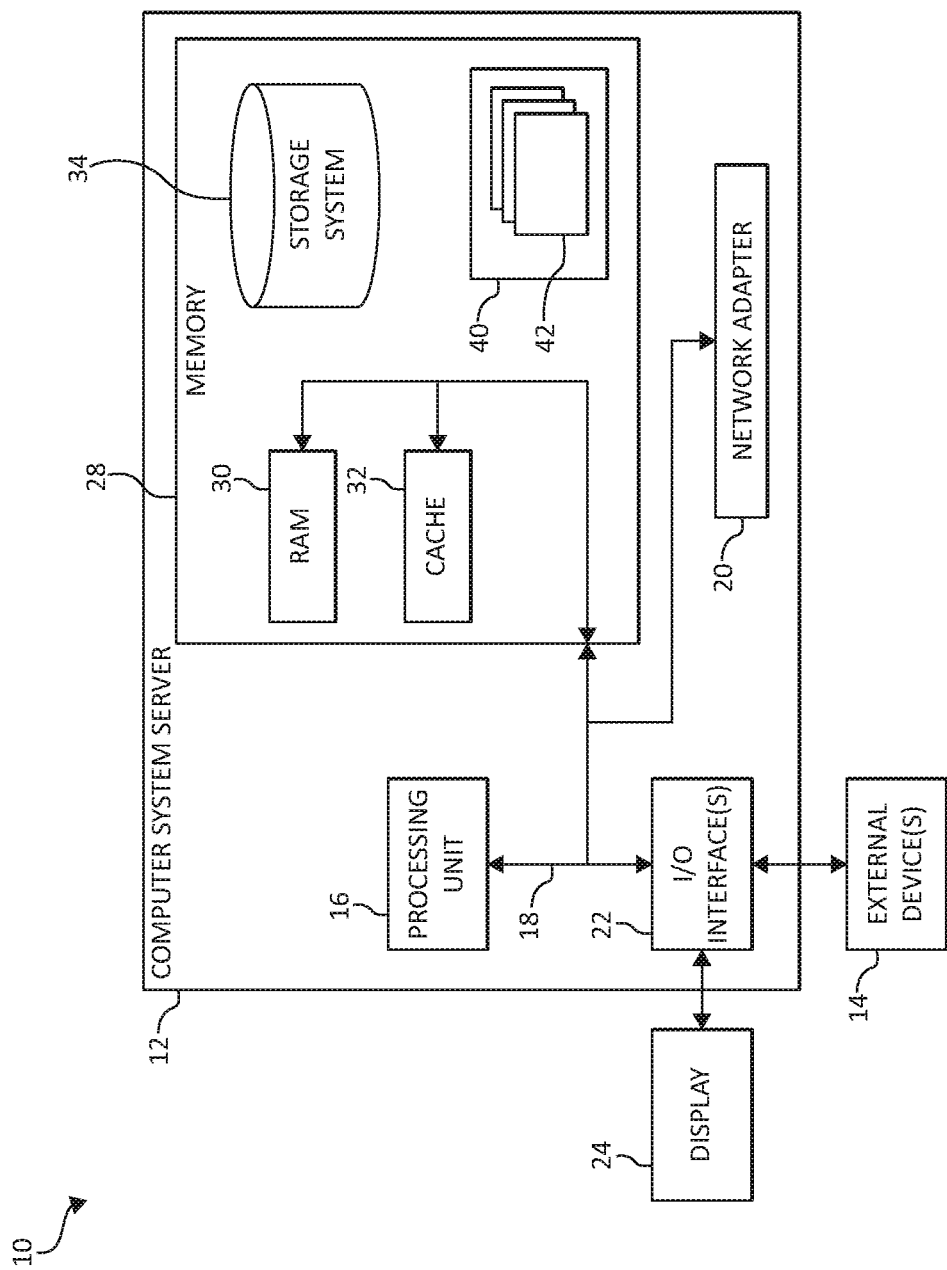
FIG. 1 is a block diagram depicting an exemplary cloud computing node according to an embodiment of the present invention.

As the amount of electronic information continues to increase, the demand for sophisticated information access systems also grows. Digital or "online" data has become increasingly accessible through real-time, global computer networks. The data may reflect many aspects of the behavior of groups or individuals in a population, including scientific, educational, financial, travel, traffic flow, shopping and leisure activities, healthcare, and so forth. Many data-intensive applications require the extraction of information from data sources. The extraction of information may be obtained through a knowledge generation process that may include initial data collection among different sources, data normalization and aggregation, and final data extraction.

Moreover, businesses or organizations may undergo various types of auditing. A financial institution may be audited to ensure certain processes, rules, laws, and/or regulations are in place along with verifying the compliance with these processes, rules, laws, and/or regulations. These audits may provide valuable data and insights describing various problems associated with the businesses or organizations. For example, audit reports may be used in operational risk management environments. Technical notes may be used to describe problems, computer application anomalies or bugs, and resolutions for solving the various problems, anomalies, or bugs.

Moreover, a collection of legal documents related to a specific issue (e.g., import/export issues) and descriptions of current practices of a specific industry or business may be used for legal compliance. In order for a business or an organization to apply appropriate remediative adjustments to any reoccurring problem, it is critical to be able to associate and explain a specific problem against tangible causal factors.

As such, there is a need to accurately identify the root cause of problems that may be reoccurring in audit data. In one aspect, a system or method may provide for a collection of documents (e.g., digital data) that may be maintained that describe a plurality of problems that have occurred within a process or business practice while also providing one or more solutions to such challenges or problems. Documents describing the business process may be provided in a given domain (text). A semantic analysis may be performed on the documents and one or more semantic relationships may be identified (e.g., identified "on the fly" and/or in real time) from the text data being analyzed in the documents. That is, a cause and effect relationship may be identified or "inferred" as part of the identifying semantic relationships. A first order probabilistic logical model may be adopted and used. The probabilistic logic may be where truth values of text data of sentences are probabilities. The proposed semantic analysis induces a probabilistic logical consequence or "entailment" (e.g. a relationship between statements that hold true when one logically "follows from" one or more others), which may reduce to ordinary logical entailment when the probabilities of all text data of sentences are either 0 or 1. The cause and effect relationship may be inferred using the first-order probabilistic logical representation of knowledge thereby automatically identifying the root causes of the problems in audit data.

The system or method may identify the root cause(s) that may have generated the problems identified by the documents. A confidence value (probability) may be associated with the root cause(s) that are identified. One or more causal factors may be identified for the problems described in the input documents. A confidence value (probability) associated with the causal factors may also be provided. An explanation for the identified causal factors may be generated to explain the identified root cause.

The mechanisms of the illustrated embodiments provide a solution to automatically identify the causal factors and the root cause of a re-occurring problem described by one or more collection of documents, such as included in audit data and business processes documentation. In one aspect, a probabilistic logic representation may be extracted from text data representing a knowledge domain according to an ontology to identify one or more reoccurring problems of the knowledge domain. A root cause and one or more causal factors of the one or more reoccurring problems is automatically identified using the logical representation such that the identifying associates a confidence level for the root cause and the one or more causal factors.

For example, for legal compliance, a collection of legal documents (e.g., laws, regulations) related to a specific issue (e.g., import/export) may be received, as well as a description of the current practices of a specific business. The text inputs may be ingested and a probabilistic logic representation may be extracted and an inference can be made as to whether the business is compliant with the current export regulations. The probable root cause that may have caused the business to be non-compliant may be reported.

In one aspect, the term "domain" is a term intended to have its ordinary meaning. In addition, the term "domain" can include an area of expertise for a system or a collection of material, information, content and/or other resources related to a particular subject or subjects. For example, a domain can refer to financial, healthcare, advertising, commerce, scientific, industrial, educational, medical and/or biomedical-specific information. A domain can refer to information related to any particular subject matter or a combination of selected subjects.

The term ontology is also a term intended to have its ordinary meaning. For example, an ontology may include information or content relevant to a domain of interest or content of a particular class or concept. Content can be any searchable information, for example, information distributed over a computer-accessible network, such as the Internet. A concept or topic can generally be classified into any of a number of content concepts or topics which may also include one or more sub-concepts and/or one or more sub-topics. Examples of concepts or topics may include, but are not limited to, scientific information, healthcare information, governmental information, medical information, biomedical information, business information, educational information, commerce information, financial information, pricing information, information about individual people, cultures, groups, sociological groups, legal and regulatory information, market interest groups, institutions, universities, governments, teams, or any other information group. The ontology can be continuously updated with the information synchronized with the sources, adding information from the sources to the ontology as models, attributes of models, or associations between models within the ontology.

The mechanisms of the illustrated embodiments provide a system that may extract a probabilistic logic representation from text data and infer whether the business or organization is compliant with rules, laws, policies, and/or regulations. The probable root cause may be identified and reported such that a business may transition from non-compliance to compliance. In general, any input of this form (i.e. collection of documents describing the problems and collection of documents describing solutions) and ontology describing the business process.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
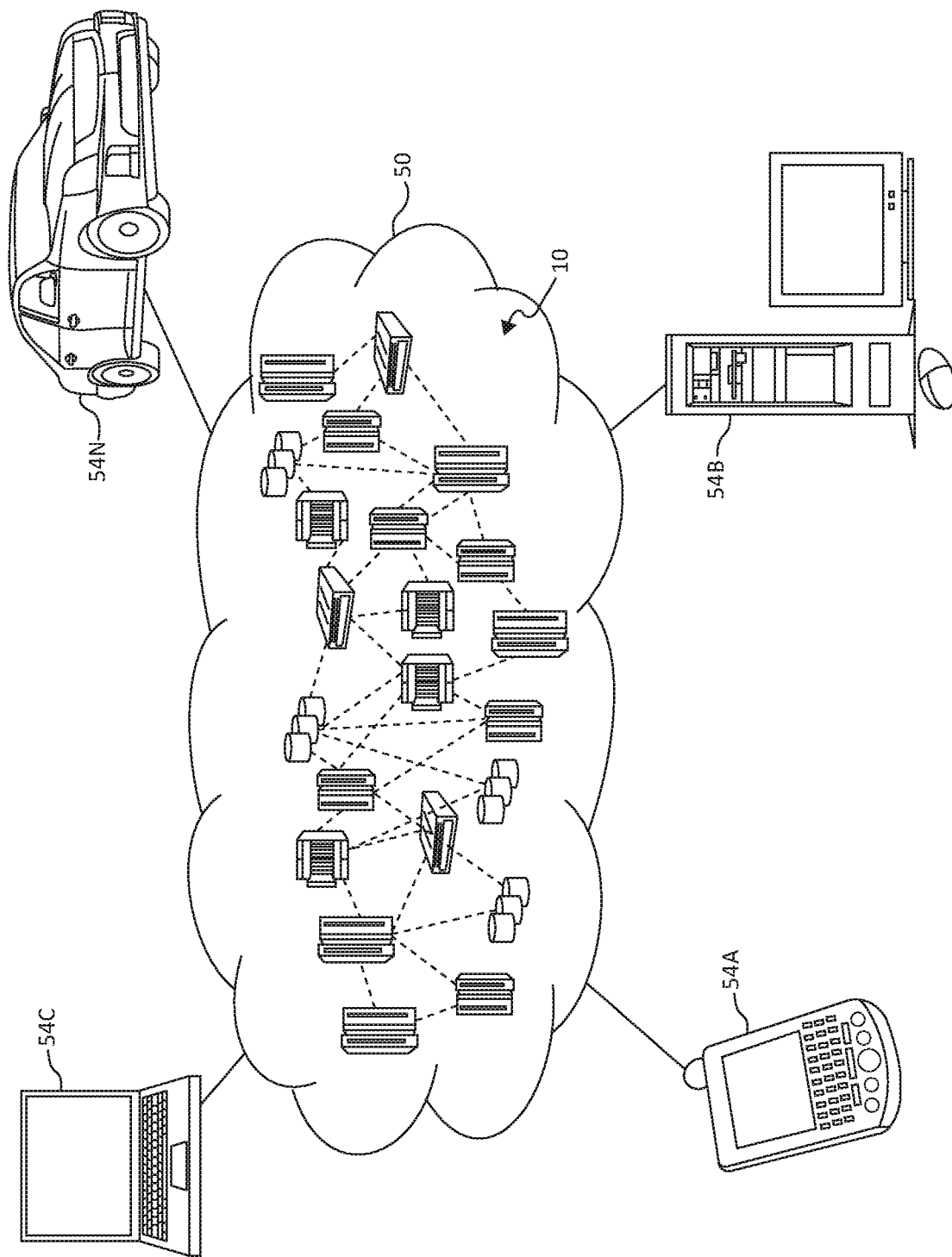
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
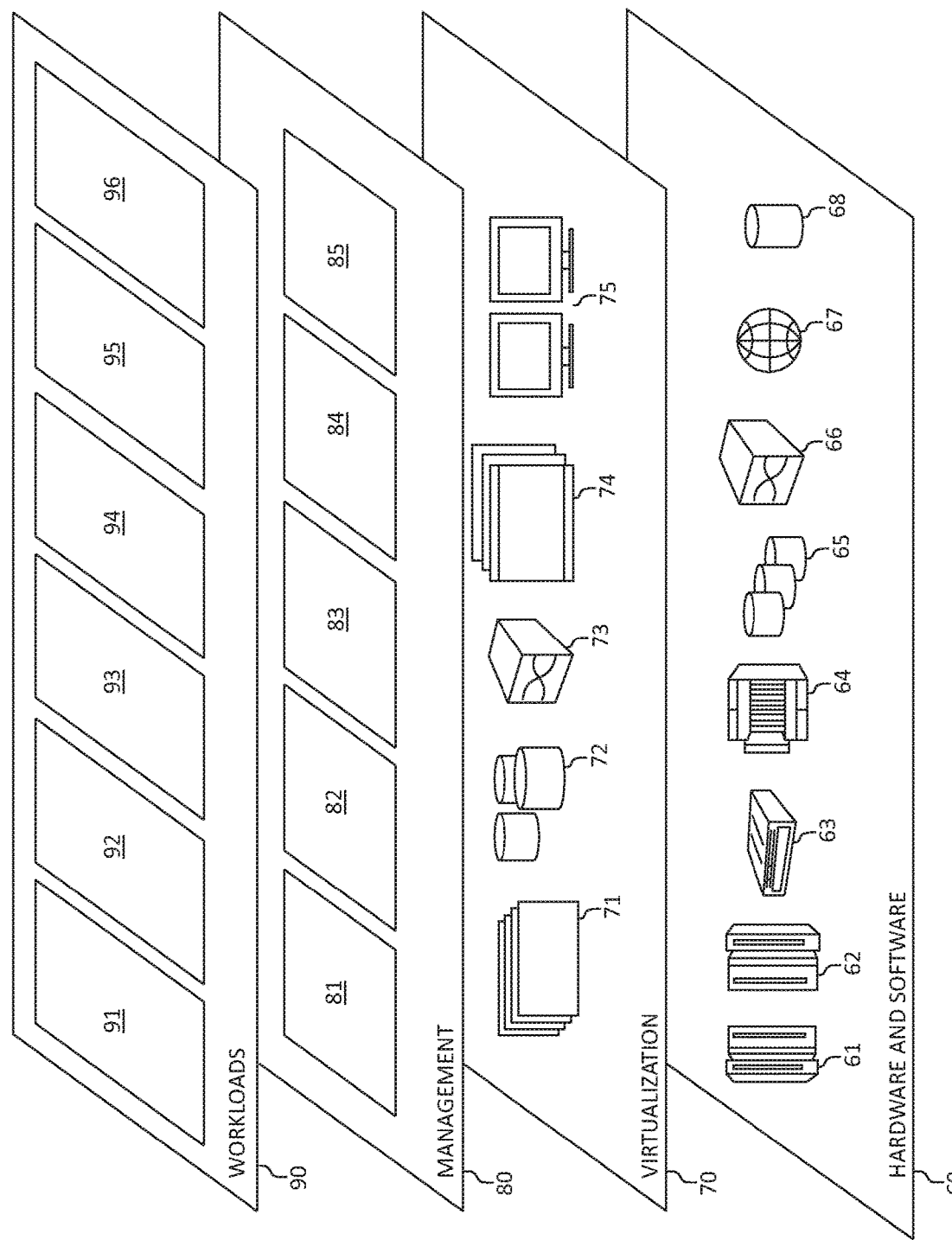
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various targeted learning and recruitment workloads and functions 96. In addition, targeted learning and recruitment workloads and functions 96 may include such operations as user profile analytics, user attribute analysis, and as will be further described, user and device management functions. One of ordinary skill in the art will appreciate that the targeted learning and recruitment workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches for the improvement of root cause identification in audit data by, among other aspects, using attributes obtained from a user profile to identify a user as a potential candidate for performing an activity related to the root cause identification in audit data.

Figure 4:
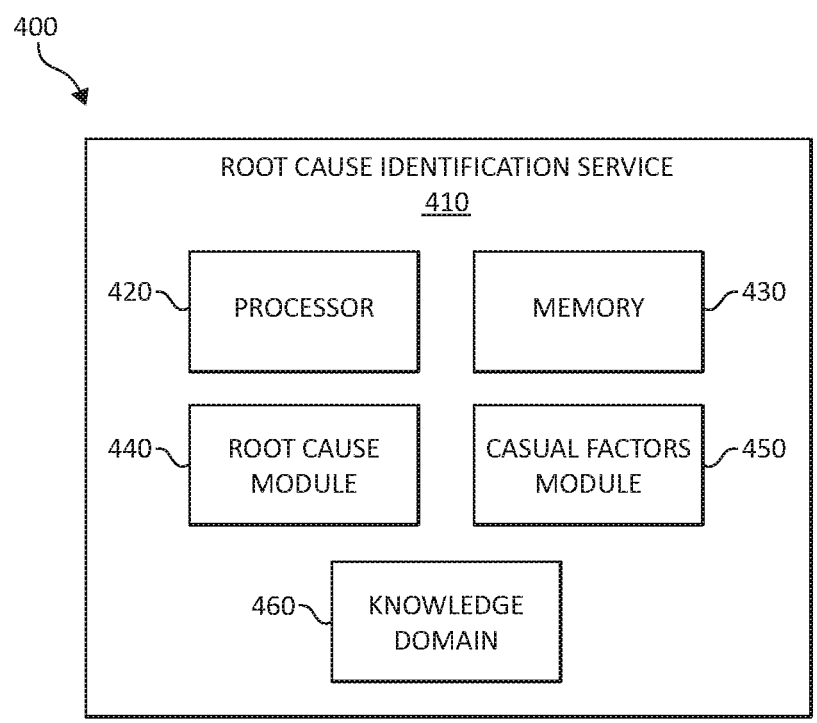
FIG. 4 is an additional block diagram depicting various user hardware and cloud computing components functioning in accordance with aspects of the present invention.

Turning now to FIG. 4, a block diagram depicting exemplary functional components 400 according to various mechanisms of the illustrated embodiments, is shown. A root cause identification service 410 is shown, incorporating processing unit 420 ("processor") to perform various computational, data processing and other functionality in accordance with various aspects of the present invention. The processing unit 420 may be in communication with memory 430. A root cause module 440, a casual factors module 450, and a knowledge domain 460 (e.g., an ontology) are also shown.

As one of ordinary skill in the art will appreciate, the depiction of the various functional units in root cause identification service is for purposes of illustration, as the functional units may be located within a root cause identification service 410 or elsewhere within and/or between distributed computing components. The knowledge domain 460 may include a data repository of concepts, topics, business processes, problems and solutions of the root cause identification service 410. The knowledge domain 460 may work in concert with processing unit 420 and memory 430 to accomplish various aspects of the present invention, such as, for example extracting a logical representation from text data representing a knowledge domain according to the knowledge domain 460 to identify one or more reoccurring problems.

The root cause module 440 and causal factors module 450 may each work in concert with processing unit 420 and memory 430 to accomplish various aspects of the present invention. For example, root cause module 440 and causal factors module 450 may undergo various data analytics functions associated with the text data to find a root cause having a confidence value and one or more causal factors also with a confidence value. As one of ordinary skill in the art will appreciate, the root cause module 440 and causal factors module 450 may implement mathematical modeling, probability and statistical analysis or modeling, probabilistic logic, text data compression, or other data processing technologies to carry out the various mechanisms of the illustrated embodiments.

For example, the root cause module 440 and causal factors module 450 may automatically identify a root cause and one or more causal factors of reoccurring problems using the logical representation. A confidence level for the root cause and the one or more causal factors may be calculated and determined for the root cause module 440 and causal factors module 450. In one aspect, calculation may be performed using various mathematical operations or functions that may involve one or more mathematical operations (e.g., using addition, subtraction, division, multiplication, standard deviations, means, averages, percentages, statistical modeling using statistical distributions, by finding minimums, maximums or similar thresholds for combined variables, etc.).

Figure 5:
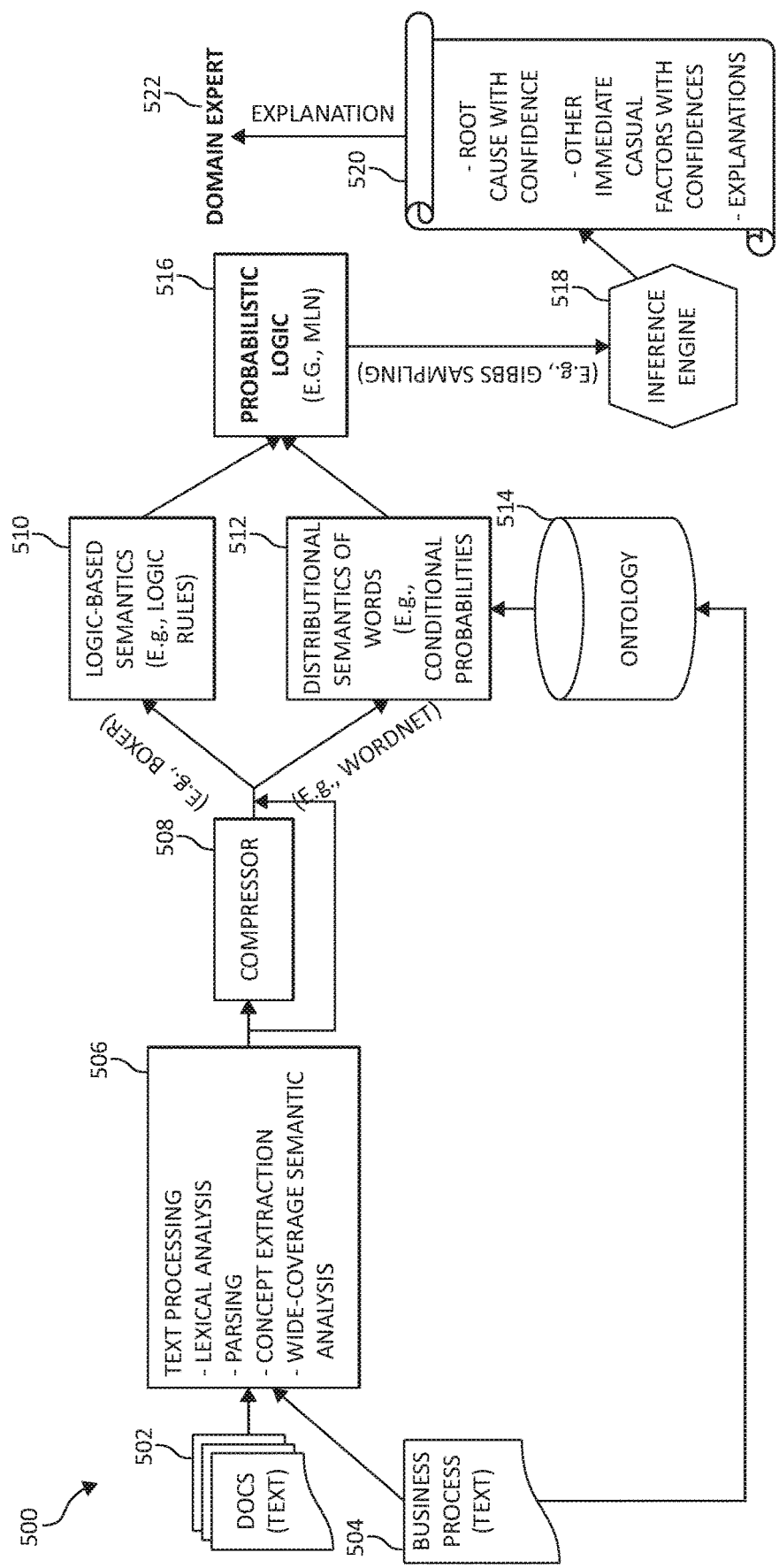
FIG. 5 is an additional flow diagram depicting root cause identification in audit data in accordance with aspects of the present invention.

Turning now to FIG. 5, a flow diagram 500 depicting root cause identification in audit data. In one aspect, one or more of the components, modules, services, applications, and/or functions described in FIGS. 1-4 may be used in FIG. 5. For example, computer system/server 12 of FIG. 1, incorporating processing unit 16, may be used to perform various computational, data processing and other functionality in accordance with various aspects of the present invention.

Also, as shown, the various blocks of functionality are depicted with arrows designating the blocks' 500 relationships with each other and to show process flow. Additionally, descriptive information is also seen relating each of the functional blocks 500. As will be seen, many of the functional blocks may also be considered "modules" of functionality. With the foregoing in mind, the module blocks 500 may also be incorporated into various hardware and software components of a system for targeted learning and recruitment in accordance with the present invention. Many of the functional blocks 500 may execute as background processes on various components, either in distributed computing components, or on the user device, or elsewhere.

In one aspect, at block 502 and 504, documents and/or business processes (text) may be received for text processing at block 506. That is, documents describing problems that may have occurred in a business process and their proposed solutions (text) may be provided in block 502, while business process descriptions (text, optional) may be provided from block 504. At block 506, the input text data may be processed using a lexical analysis, parsing, extraction of concepts, semantic analysis (e.g., wide-coverage semantic analysis), or a combination thereof.

For example, the lexical analysis may include, but is not limited to, a lexical analyzer that may scan or read input characters from a source document or program and produce as output a sequence of tokens, which may be referred to as "tokenization" because the process generates a sequence of output tokens representing strings contained in the input source program. The identification of strings and delimiters may be a necessary task for many language processing tasks. The extraction of concepts may include, but is not limited to, extraction of information through a knowledge generation process that may include initial data collection among different sources, data normalization and aggregation, and final data extraction. Also, the extraction of concepts and/or topics may include, but is not limited to, performing knowledge extraction from natural language text documents including reading input text; transforming the input text into a machine understandable knowledge representation so as to provide knowledge libraries from said documents, and using semantic based means for extracting concepts and their interrelations from said input text. Knowledge structures may be used consisting of concepts and topics, such as problems and solutions, and the interrelations of the problems and solutions. In one aspect, the parsing may include, but is not limited to, parsing the alphanumeric text strings in audit documents and business processes to identify problems or reoccurring problems and solutions in the audit documents and business processes. One or more parse trees for the plain text may be generated on the grammar of a natural language, the parse trees may be mapped on to instance trees generated based on an application-specific model. In one aspect, the semantic analysis may include, but is not limited to, analyzing the concepts, topics, subjects, actions, and objects in audit documents and/or business processes and organizing these representations into a set of topics, set of words with probabilities, and/or a set of problem-solution pairs.

The processed text data may then be compressed, as in block 508. At block 510, the text data may be processed to extract logic-based semantics (e.g., logic rules) using, for example, semantic parsing with combinatory categorical grammars and semantic role labeling, while at block 512, the text data may be processed to extract the distributional semantics of words (e.g., conditional probabilities). A knowledge domain of an ontology, which may extract data from the business processes (text) (from block 504) and from the text data (from block 502), may be used to assist with the construction of the logical representation as in block 514. A probabilistic logical representation may be extracted from the logic-based semantics and/or from the distributional semantics of words (e.g., conditional probabilities) from text data representing a knowledge domain according to an ontology to identify one or more reoccurring problems of the knowledge domain, at block 516. The probabilistic logic may be provided to an inference engine, at block 518 (e.g., a markov chain monte carlo 'MCM' algorithm, such as Gibbs sampling). An extract of a logical representation from text data representing a knowledge domain according to an ontology to identify one or more reoccurring problems of the knowledge domain may be performed at block 520. That is, the inference engine (block 518) may be used to infer causal factors (e.g., one or more factors or issues that may cause a problem) of the problems, identify a deeper root cause of the problems, and provide supporting evidence for causal factors and the root cause in form of logical statements. An explanation may be provided to a domain expert 522.

Figure 6:
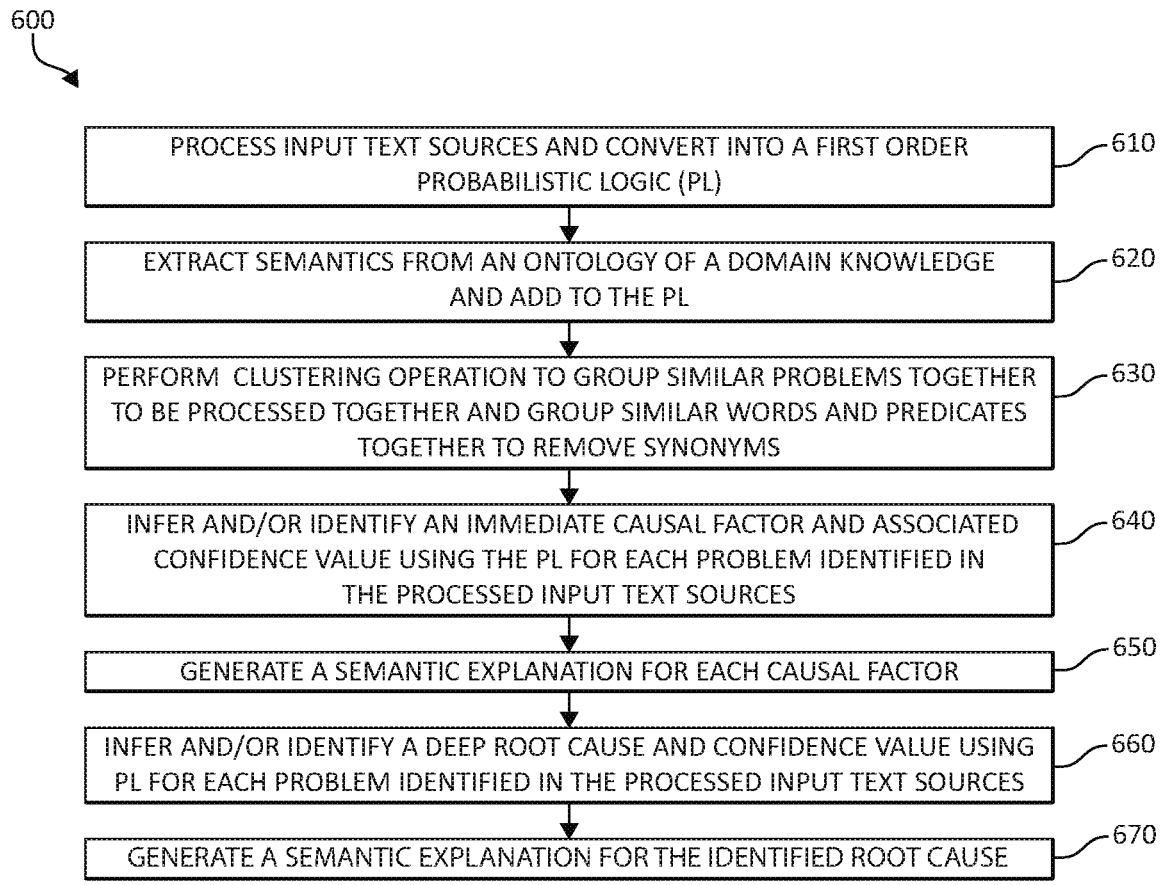
FIG. 6 is an additional flow diagram depicting root cause identification in audit data in which aspects of the present invention may be realized.

FIG. 6 is an additional flow diagram depicting root cause identification in audit data in which aspects of the present invention may be realized. In one aspect, one or more of the components, modules, services, applications, and/or functions described in FIGS. 1-5 may be used in FIG. 6. The functionality 600 may be implemented as a method executed as instructions on a machine, where the instructions are included on at least one computer readable medium or one non-transitory machine-readable storage medium. Starting in block 610, input text sources (e.g., documents and/or business processes and concepts of "audit data" or audit reports) may be processed and converted into a first order probabilistic logic (PL). The PL provides a probabilistic framework that accounts for uncertainty in the data. Semantics may be extracted from an ontology of a domain knowledge and added to the PL, as in block 620. A clustering operation, which may be optional, may be performed to group similar problems together to be processed together and group similar words and predicates together to remove synonyms, as in block 630. A causal factor and associated confidence value may be inferred and/or identified using the PL for each problem identified in the processed input text sources, as in block 640. A semantic explanation may be generated for each causal factor (e.g., "Absence of ticketing system X implies failure to comply with regulation Y"), as in block 650. A deep root cause and confidence value may be inferred and/or identified using PL for each problem identified in the processed input text sources, as in block 660. A semantic explanation may be generated for the identified root cause (e.g., "absence of ticketing system X implies failure to comply with regulation Y which makes illegal to trade under company Z"), as in block 670.

Thus, the mechanisms of the embodiments provide an automated way of formalizing domain knowledge from problem-resolution pairs expressed in textual form by automatically inferring root causes from different problem descriptions with supporting evidence in the form of logic-based statements that may be validated by a subject matter expert. The mechanisms of the embodiments provide fully probabilistic framework thus accounting for uncertainty in data. The causal factors and the relationships between them from the input text data may be inferred. Explanations may be provided for the identified causal factors and/or root cause in a single or multiple audit report describing multiple problems and their solutions. Said differently, the mechanisms of the embodiments provide a fully automated process of knowledge extraction, inference of causal factors, and/or identification of root causes of reoccurring problems in the data.

Figure 7:
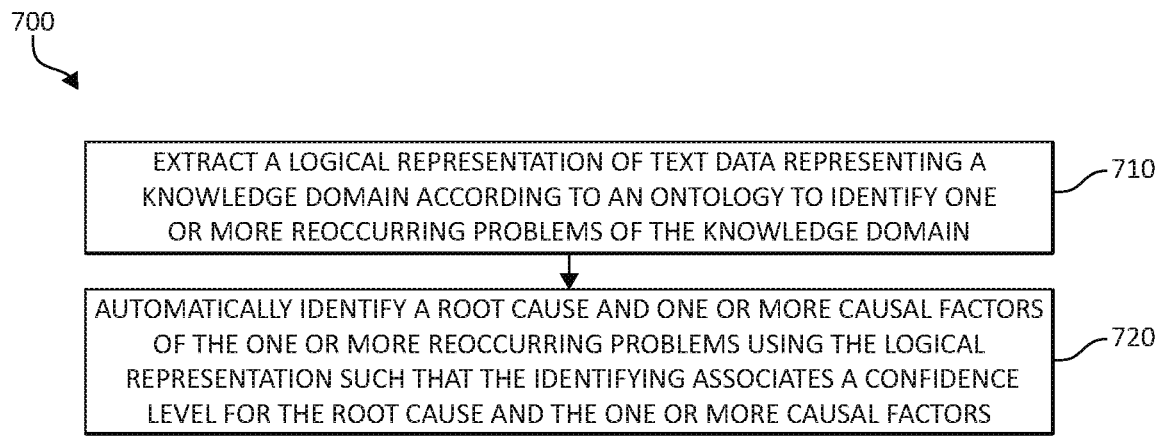
FIG. 7 is an additional flowchart diagram depicting an additional exemplary method for root cause identification in audit data by a processor, again in which aspects of the present invention may be realized.

FIG. 7 is an additional flowchart diagram depicting an additional exemplary method for root cause identification in audit data by a processor, again in which aspects of the present invention may be realized. The functionality 700 may be implemented as a method executed as instructions on a machine, where the instructions are included on at least one computer readable medium or one non-transitory machine-readable storage medium. Starting in block 710, a probabilistic logical representation may be extracted from text data representing a knowledge domain according to an ontology to identify one or more reoccurring problems of the knowledge domain. A root cause and one or more causal factors of the one or more reoccurring problems is automatically identified using the logical representation such that the identifying associates a confidence level for the root cause and the one or more causal factors, as in block 720.

In one aspect, in conjunction with and/or as part of at least one block of FIGS. 6-7, the operations of 600 or 700 may include each of the following. The operations of 600 or 700 may include compressing text data upon processing the text data using a lexical analysis, parsing, extraction of concepts, semantic analysis, or a combination thereof. The extracting of probabilistic logical representation further includes converting the text data into a first order probabilistic logical (PL) representation of the knowledge domain. Similar reoccurring problems may be clustered together from the logical representation and the ontology. Semantically related text may be clustered together to remove synonyms from the text data. One or more causal factors may be inferred from each of the one or more reoccurring problems identified in the text data and a solution provided in the ontology for each of the one or more reoccurring problems. Natural language processing (NLP) may be used to provide logical form evidence used for identifying the one or more causal factors between the one or more reoccurring problems and the logical representation. The NLP may also provide logical form evidence for identifying the root cause between the one or more reoccurring problems and the logical representation.

The mechanisms of the illustrated embodiments provide a system where inputs into the system may be a collection of audit documents. The output of the system may be hierarchical clustering of predicates. In one aspect, a set of topics may be extracted from the audit documents (e.g., using a Topic Model), where a topic may be a set of words with probabilities. A hierarchical clustering may be performed on topics to group similar topics into clusters such as, for example, by using a k-center algorithm, discrimination information (e.g., a Kulback Leibler divergence), and/or cosine distance between the topics). In one aspect, the hierarchical clustering may proceed by iteratively considering all pairs of similarities of topics, and fusing the pair which exhibits the greatest similarity. That is, the hierarchical document clustering may employ a document similarity measurement operation and consider the similarities of all pairs of documents in a given corpus. The most similar pair may be fused together and the process iterated after suitably extending the similarity measure to operate on agglomerations of documents as well as individual documents. The final output may be a binary tree structure that records the nested sequence of pairwise joints. In one aspect, a level zero of hierarchical clustering may be used for deriving predicates synonymy and other semantic relations. Also, level zero may be used to treat elements of same clusters unitary by considering a cluster representative. Once the hierarchical clustering has been performed a clustering optimization operation may be performed.

In one aspect, a causal factor of the problem or reoccurring problem may be inferred and/or identified. A problem-resolution pair may be created and/or identified by identifying a problem and associated with the problem a matching resolution to the problem. The problem-resolution may be a special property that can be leveraged to identify the causal factor. The problem-resolution pair provides new information about activities that have been undertaken to solve the problem.

Consider the following example of an implementation of the aforementioned functionality. In one aspect, for processing input text, consider the following functional operation as described using the following pseudocode. Start pseudocode: "Let knowledge base "KB"={ } and let "Ont" be the ontology automatically extracted from input text. An expert knowledge domain may be added to the ontology. For each audit report A and each sentence S in the report A, parse the sentence S using a standard semantic parser with combinatory categorical grammars (CCG) and semantic role labeling into a parse tree T. Let clause "C" be the 1st order logical formula (clause) extracted from parse tree T using a logical rule extractor. Clause "C" can be added to knowledge base "KB". For each business process description B and each sentence S in the business process description B, sentence S may be parsed using a standard semantic parser (CCG) into a parse tree T. Let clause "C" be the 1st order logical formula extracted from parse tree T using a logical rule extractor. The clause C can be added to knowledge base KB. A post-processing operation may be performed such that the post-processing of knowledge base KB results in the predicates corresponding to synonyms are the same and the predicates are also aligned with the entities in ontology ("Ont"). One or more additional or new logical formulas corresponding to expert knowledge (if available) may be added to the knowledge base "KB". Finish pseudocode.

In one aspect, for converting the text data into a first order probabilistic logical (PL) representation of the knowledge domain, a Markov logic network (MLN) may be used. MLN is a probabilistic logic which applies a Markov network or undirected graphical model (e.g., a set of random variables, having a memoryless property of a stochastic process, described by an undirected graph, to a first-order logic enabling uncertain inference). In other words, MLN may be a set of pairs (F, w) where F is a formula in first-order logic and w is a weight (real number). These weights can be determined a priori, or can be learned from observed data or examples. Together with a set of constants, MLN defines a network with one node for each grounding (achieved by assigning a constant to a variable) of each predicate in a MLN. MLN may be used to infer properties of objects and outcomes of events or actions. A geo-spatial and visual ontology can be developed to provide the attribute set of an object and a rule set for inferencing.

In one aspect, the MLN, which includes first order logic clauses that have weights assigned thereto, wherein the clauses capture general dependencies in a domain covered by the MLN and a weight is indicative of importance that a dependency captured by the clause should hold. In operation, the MLN can be used to infer probabilities about relationships among entities. For instance, a MLN can model interactions between problems and solutions in an audit document and be configured to predict a probability that any given solution is solution to a problem, such as the problem-resolution pair.

In one aspect, for compiling the probabilistic logic (e.g., using MLN), consider the following functional operation as described, at least in part, using the following pseudocode. Start pseudocode: "Let knowledge base KB be the 1st order knowledge base extracted from the input text. For each clause "C" in the knowledge base KB, let $\{P_1, \ldots, P_n\}$ be the predicates in clause C. For each predicate P: let Wi be the word(s) that were mapped to Pi (e.g., the "ith" predicate P) in the parse tree and compute the conditional probability according to P(Wi|sentence), where "sentence" is the original sentence from which clause C was generated (e.g., making use of distributional semantics of words in the context of other words, such as, for example, extracted from a WordNet ontology tree). The weight of clause C can be calculated as the product of P(Wi|sentence). An augmented knowledge base KB can be returned, where each clause may be associated with a weight w, which may include normalizing the weights." Finish pseudocode.

In one aspect, for identifying a causal factor (e.g., causal factor identification), consider the following functional operation as described, at least in part, using the following pseudocode. Start pseudocode: "Let M be the MLN compiled from input sources: 1 audit, 1 business process semantical explanations. Let $P=\{P_1, \ldots P_m\}$ be each of the predicates in M, and let $Q=2^{\wedge}P$ be a power set of each of the predicates P (including positive and negated predicates). Assume element Qi of Q is either a single predicate or a conjunction of predicates. Let F be the formula corresponding to the 'PROBLEM' section of the audit. Instead of formula F, a most relevant sub-formula "G" of formula F can be used, which explains the problem given in a corresponding report. Let "CANDIDATES" be the set of all possible simple implications of the form (Qi→F, where Qi is a subsets of Q). For each element Ci in CANDIDATES and for each possible grounding of Ci in M. The marginal probability of formula Ci in M may be computed, such as, for example, according to equation Prob(Ci|M), where Prob is the probability. The element Ci may be returned having the highest marginal probability. A causal factor is therefore the left hand side of the implication Qi→F corresponding to Ci (assuming everything is grounded). Its confidence value may be Prob(Ci|M). If Qi is a single predicate then there is a probable causal factor. However, if Qi is a conjunction of predicates, then there may be a set of probable causal factors." Finish pseudocode.

In one aspect, for inferring a root cause for a problem or reoccurring problem (e.g., a root cause is a common cause for several related problems), consider the following functional operation as described, at least in part, using the following pseudocode. Start pseudocode: "Let M be the MLN compiled from one or more input sources. Assume $\{A_1, \ldots, A_n\}$ are audit reports describing several related problems. Let $P=\{P_1, \ldots P_m\}$ be all the predicates in M. Let $Q=2^{\wedge}P$ be the power set of P (including positive and negated predicates). Assume Qi is a single predicate or a conjunction of predicates. Let $F=\{F_1, \ldots, F_n\}$, where Fi is the formula corresponding to the 'PROBLEM' sections of audit report Ai. For each Fi, a most relevant sub-formula Gi of Fi can be used that explains the problem given in the corresponding Ai. Let "CANDIDATES" be a set of all possible implications (Qi→F1∧ . . . ∧ Fn, where Qi is in Q). For each element Ci in CANDIDATES and for each possible grounding of Ci in M, a marginal probability of Ci in M (e.g., Prob(Ci|M)) may be computed using standard inference algorithms in the MLN. Also for each element Ci in CANDIDATES and for each possible grounding of Ci in M, the element Ci having the highest marginal probability may be returned. A root cause is therefore the left hand side of the implication Qi→F (either a single predicate or a conjunction of predicates). The confidence value of the root cause is Prob(Ci|M)." Finish pseudocode.

In one aspect, for performing an operation of inferring a probable root cause for a problem or reoccurring problem (e.g., a root cause is a deeper cause common for several related problems), consider the following functional operation as described, at least in part, using the following pseudocode. Start pseudocode: "Let M be the MLN compiled from input sources. Assume $\{A_1, \ldots, A_n\}$ audit reports describing several related problems. Let $P=\{P_1, \ldots P_m\}$ be all the predicates in M; let $Q=2^{\wedge}P$ be the power set of P (including positive and negated predicates). Assume Qi is a single predicate or an implication of this form Qi1→Qi2→ . . . Qik, where Qij are subsets of Qi. Let $F=\{F_1, \ldots F_n\}$, where Fi is the formula corresponding to the 'PROBLEM' sections of audit report Ai. For each Fi, a most relevant sub-formula Gi of Fi can be used that explains the problem given in the corresponding Ai (use for example Most Relevant Explanation (MRE) inference in MLN). Let CANDIDATES be the set of all possible implications (Qi→F1/Ä . . . /Ä Fn, where Qi is in Q). For each element Ci in CANDIDATES and for each possible grounding of Ci in M, a marginal probability of Ci in M may be computed using standard inference algorithms in the MLN. Return the element Ci having the highest marginal probability. A root cause is therefore the leftmost formula in Qi (either a single predicate or a conjunction of predicates). Its confidence value is Prob(Ci|M)." Finish pseudocode.

In addition, further consider the embodiments described herein providing an example of an audit report. The audit report may include one or more sections, such as, for example, a first portion that may include a description of a problem identified by an auditor and a second portion that may include a proposed solution or resolution to be implemented in order to prevent the identified problem from reoccurring at a future period of time. For example, a problem in the first portion may indicate "corrections are being performed directly in a Front Office System by technical standard order ("TSO") personnel and are not accompanied by manual tickets indicating the trader's authorization and explanation. A lack of evidence of trader authorization may lead to regulatory criticism." The second portion with the resolution to the problem may indicate (using generic acronyms for illustrative purposes to anonymize an actual real-world audit report) "TSO will work with the MPT and UCT Desk Manager to put in place a cancel and correct ticket for adjustments to ABC". Once completed this will create a complete audit trail for proper capture of explanations and Traders review. Consider now the MLN being extracted from the text. Said differently, the audit report is an input while the output is an MLN representation. In one aspect, one or more probabilistic logic rules may include, for example relating to a system for front desk, such as system (Front Desk Sys), an agent TS, and agent (UCT), an agent (MCT), and agent (Trader) and a new system (New Sys) using one or more of the following one or more probabilistic logic rules:

$$\forall x \forall y \text{agent}(x) \wedge \text{system}(y) \rightarrow \text{activity}(x,y) \quad (1),$$

$$\forall y \exists x \text{system}(y) \wedge \text{activity}(x,y) \rightarrow \neg \text{activity}(x,y) \quad (2),$$

$$\forall y \forall x \text{system}(y) \wedge \neg \text{authorized}(x,y) \rightarrow \neg \text{compliant}(y) \quad (3),$$

$$\forall y \forall x \text{system}(y) \wedge \text{activity}(x,y) \wedge \text{ticketed}(x,y) \rightarrow \text{compliant}(y) \quad (4),$$

$$\forall y \forall x \text{ticketed}(x,y) \rightarrow \text{authorized}(x,y) \quad (5),$$

$$\forall y \forall x \exists z \text{system}(y) \wedge \text{ticketed}(x,y) \rightarrow \text{ticketing}_{system}(z) \quad (6),$$

where x, y, and z are defined variables, such as for each agent, each activity, a number of complaints, a number of tickets, and/or a system ("sys"). Each rule may be associated with a weight which represents a degree of "importance" of that rule; intuitively, the greater the value the weight (e.g., a higher numerical weighted value) the more important is the rule. The weighted values may be used to define a joint probability distribution over all possible worlds of the knowledge base. A world may be a substitution of the variables with values (e.g., x=TSO) for all clauses and/or rules. Therefore, a world may be true with a certain probability (hence the term "probabilistic logic"). In the above example, the weights may be automatically defined and/or set. In one aspect, machine learning may be used to learn the weighted values from data. Given the probabilistic logic, one or more queries may be asked, such as, for example, "What is the probability that the absence of the ticketing system made the respective company to be non-compliant?" where the user may be interested in one or more implications related to the query, which may be for the form:

$$P(\neg \text{ticketing}_{system}(\text{NewSys}) \rightarrow \neg \text{compliant}(\text{FrontDeskSys}))=? \quad (7),$$

where P is a probability. If the probability is greater than a threshold or defined expectation of the user, a probable causal factor may be identified where a probability could be viewed as a "confidence" measure. Thus, a problem-resolution pair may be created and/or identified by identifying a problem and associated with the problem a matching resolution to the problem. The problem-resolution may be a special property that can be leveraged to identify the causal factor, namely the problem-resolution pair provides new information about activities that have been undertaken to solve the problem. In the above example, ticketing may be identified as a new way of providing an explanation and implicit authorization for solving the problem of not being compliant. Therefore, ticketing may be considered to be one the causal factors for the front office system not being compliant. In one aspect, the causal factor may also be referred to as an immediate causal factor.

In one aspect, for inferring root causes (e.g., search space optimization), consider the following functional operation as described. $Q=2^P$, as mentioned, may be the power set of P (including positive and negated predicates) and may be reduced using one or more clustering techniques. For example, root causes can be inferred using search space optimization by performing a hierarchical clustering operation. A cluster-predicate may be calculated as a predicate representative for all elements from a cluster (e.g., the predicates from the cluster center topic) and use a weight assigned to the topic. Inferring a probable root cause for a problem or reoccurring problem (e.g., a root cause is a deeper cause common for several related problems), as described above may be performed. The higher weights of the topics (as compared to lower weights of the topics) can be searched and may consider the higher levels clusters (i.e., split one cluster into its higher level clusters). Updated results may be calculated for inferring the probable deeper cause root cause of a problem or reoccurring problem for several related problems. The operations for inferring the probable deeper cause root cause of a problem or reoccurring problem for several related problems will continue until the hierarchy of cluster levels are explored or when a threshold is reached (e.g., based on minimum size of cluster to be explored). In this way, the inferring of root causes using search space optimization, provides for increased computing efficiency, provides for exploration of elements in importance order, possibility of deciding personalized cluster weights and exploration thresholds.

In one aspect, for generating an explanation, consider the following functional operation as described, at least in part, using the following pseudocode. Start pseudocode: "Let M be the MLN compiled from input sources. Let Qi be the root cause identified previously (grounded). Assert the grounded predicates of Qi as evidence in M. Compute the most probable explanation of Qi (e.g., a maximum a posteriori (MAP) configuration) by running a MAP inference operation over the grounded MLN (e.g., search algorithms to solve Boolean satisfiable problems such as WalkStat or GSAT search algorithms). Similarly, for generating most probable explanations for causal factors." Finish pseudocode.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for root cause identification in audit data, comprising:
   extracting a logical representation of text data representing a knowledge domain according to an ontology to identify one or more reoccurring problems of the knowledge domain; wherein the knowledge domain includes legal and business documents associated with a particular organization, and the identifying includes performing an audit on the legal and business documents to determine compliance with processes, rules, and legal regulations governing the particular organization;
   coincident with extracting the logical representation of the text data, parsing the legal and business documents to perform a semantic analysis of relationship dependencies between current business processes and constraints associated with the processes, rules, and legal regulations; wherein at least some of the relationship dependencies as to what constraints of the processes, rules, and legal regulations are applicable to the particular organization under the current business processes are inferred notwithstanding the at least some of the relationship dependencies between the current business processes and the processes, rules, and legal regulations are not explicitly specified in the knowledge domain as relevant to the current business processes, and wherein weights are assigned to each of the at least some of the relationship dependencies according to the inference such that the weights are indicative of an importance that a respective dependency of the current business processes subject to a respective constraint of the processes, rules and legal regulations is held;

performing a post processing operation on the text data of the knowledge domain, subsequent to completing the parsing, to confirm that all identified synonyms of predicates of clauses identified as the processes, rules, and legal regulations were correctly identified as synonyms, and further to confirm that the predicates are each aligned correctly with a particular entity in the ontology, wherein the post processing operation clusters semantically related terms and phrases to remove the synonyms from the knowledge domain, wherein clustering the semantically related terms and phrases includes clustering similar reoccurring problems together from the logical representation and the ontology, and wherein identifying the similar reoccurring problems includes:

extracting, from the parsing, similar topics identified from within the legal and business documents by performing a document similarity measurement operation to identify the similar topics on both individual documents of the legal and business documents and an agglomeration of the legal and business documents in whole, and outputting a binary tree structure recording a nested sequence of pairwise joints determined from the document similarity operation, wherein a level zero of a hierarchal cluster formed of the clustering is used for deriving predicates synonymy, and wherein the level zero is used to treat elements of same clusters unitary by use of a cluster representative;

receiving input from a user querying a probability as to whether defined casual factors specified in the input are directly or indirectly a cause of the one or more reoccurring problems, wherein, responsive to receiving the input, a problem-resolution pair is created using semantics in the input providing new information about activities previously undertaken to solve the one or more reoccurring problems, and wherein the problem-resolution pair correspond to the at least some of the relationship dependencies and the weights associated with the at least some of the relationship dependencies;

automatically identifying a root cause and one or more causal factors of the one or more reoccurring problems using the logical representation and the input such that the identifying associates a confidence level for the root cause and the one or more causal factors; and using natural language processing (NLP) to provide logical form evidence for identifying the root cause between the one or more reoccurring problems and the logical representation such that the logical form evidence is presented to a user in a form of logic-based NLP statements, including, when the one or more reoccurring problems are legally-based, an identification as to which of the one or more casual factors recursively contribute to an infringement of one of the legal regulations governing the particular organization and an explanation of causation thereof.

2. The method of claim 1, further includes compressing the text data upon processing the text data using a lexical analysis, extraction of concepts, semantic analysis, or a combination thereof.

3. The method of claim 1, wherein the extracting further includes converting the text data into a first order probabilistic logical (PL) representation of the knowledge domain.

4. The method of claim 1, further including inferring the one or more causal factors with each of the one or more reoccurring problems identified in the text data and a solution provided in the ontology for each of the one or more reoccurring problems.

5. The method of claim 1, further including using the NLP to provide the logical form evidence used for identifying the one or more causal factors between the one or more reoccurring problems and the logical representation.

6. A system for root cause identification in audit data, comprising:

one or more computers with executable instructions that when executed cause the system to:

extract a logical representation of text data representing a knowledge domain according to an ontology to identify one or more reoccurring problems of the knowledge domain; wherein the knowledge domain includes legal and business documents associated with a particular organization, and the identifying includes performing an audit on the legal and business documents to determine compliance with processes, rules, and regulations governing the particular organization;

coincident with extracting the logical representation of the text data, parse the legal and business documents to perform a semantic analysis of relationship dependencies between current business processes and constraints associated with the processes, rules, and legal regulations; wherein at least some of the relationship dependencies as to what constraints of the processes, rules, and legal regulations are applicable to the particular organization under the current business processes are inferred notwithstanding the at least some of the relationship dependencies between the current business processes and the processes, rules, and legal regulations are not explicitly specified in the knowledge domain as relevant to the current business processes, and wherein weights are assigned to each of the at least some of the relationship dependencies according to the inference such that the weights are indicative of an importance that a respective dependency of the current business processes subject to a respective constraint of the processes, rules and legal regulations is held;

perform a post processing operation on the text data of the knowledge domain, subsequent to completing the parsing, to confirm that all identified synonyms of predicates of clauses identified as the processes, rules, and legal regulations were correctly identified as synonyms, and further to confirm that the predicates are each aligned correctly with a particular entity in the ontology, wherein the post processing operation clusters semantically related terms and phrases to remove the synonyms from the knowledge domain, wherein clustering the semantically related terms and phrases includes clustering similar reoccurring problems together from the logical representation and the ontology, and wherein identifying the similar reoccurring problems includes:

extracting, from the parsing, similar topics identified from within the legal and business documents by performing a document similarity measurement operation to identify the similar topics on both individual documents of the legal and business documents and an agglomeration of the legal and business documents in whole, and outputting a binary tree structure recording a nested sequence of pairwise joints determined from the document similarity operation, wherein a level zero of a hierarchal cluster formed of the clustering is used for deriving predicates synonymy, and wherein the level zero is used to treat elements of same clusters unitary by use of a cluster representative;

receive input from a user querying a probability as to whether defined casual factors specified in the input are directly or indirectly a cause of the one or more reoccurring problems, wherein, responsive to receiving the input, a problem-resolution pair is created using semantics in the input providing new information about activities previously undertaken to solve the one or more reoccurring problems, and wherein the problem-resolution pair correspond to the at least some of the relationship dependencies and the weights associated with the at least some of the relationship dependencies;

automatically identify a root cause and one or more causal factors of the one or more reoccurring problems using the logical representation and the input such that the identifying associates a confidence level for the root cause and the one or more causal factors; and use natural language processing (NLP) to provide logical form evidence for identifying the root cause between the one or more reoccurring problems and the logical representation such that the logical form evidence is presented to a user in a form of logic-based NLP statements, including, when the one or more reoccurring problems are legally-based, an identification as to which of the one or more casual factors recursively contribute to an infringement of one of the legal regulations governing the particular organization and an explanation of causation thereof.

7. The system of claim 6, wherein the executable instructions compress the text data upon processing the text data using a lexical analysis, extraction of concepts, semantic analysis, or a combination thereof.

8. The system of claim 6, wherein the executable instructions convert the text data into a first order probabilistic logical (PL) representation of the knowledge domain.

9. The system of claim 6, wherein the executable instructions infer the one or more causal factors with each of the one or more reoccurring problems identified in the text data and a solution provided in the ontology.

10. The system of claim 6, wherein the executable instructions use the NLP to provide the logical form evidence used for identifying the one or more causal factors between the one or more reoccurring problems and the logical representation.

11. A computer program product, by a processor, for root cause identification in audit data, the computer program product comprising a non-transitory computer-readable storage medium having computer-readable program code portions stored therein, the computer-readable program code portions comprising:

an executable portion that extracts a logical representation of text data representing a knowledge domain according to an ontology to identify one or more reoccurring problems of the knowledge domain; wherein the knowledge domain includes legal and business documents associated with a particular organization, and the identifying includes performing an audit on the legal and business documents to determine compliance with processes, rules, and regulations governing the particular organization;

an executable portion that, coincident with extracting the logical representation of the text data, parses the legal and business documents to perform a semantic analysis of relationship dependencies between current business processes and constraints associated with the processes, rules, and legal regulations; wherein at least some of the relationship dependencies as to what constraints of the processes, rules, and legal regulations are applicable to the particular organization under the current business processes are inferred notwithstanding the at least some of the relationship dependencies between the current business processes and the processes, rules, and legal regulations are not explicitly specified in the knowledge domain as relevant to the current business processes, and wherein weights are assigned to each of the at least some of the relationship dependencies according to the inference such that the weights are indicative of an importance that a respective dependency of the current business processes subject to a respective constraint of the processes, rules and legal regulations is held;

an executable portion that performs a post processing operation on the text data of the knowledge domain, subsequent to completing the parsing, to confirm that all identified synonyms of predicates of clauses identified as the processes, rules, and legal regulations were correctly identified as synonyms, and further to confirm that the predicates are each aligned correctly with a particular entity in the ontology, wherein the post processing operation clusters semantically related terms and phrases to remove the synonyms from the knowledge domain, wherein clustering the semantically related terms and phrases includes clustering similar reoccurring problems together from the logical representation and the ontology, and wherein identifying the similar reoccurring problems includes:

extracting, from the parsing, similar topics identified from within the legal and business documents by performing a document similarity measurement operation to identify the similar topics on both individual documents of the legal and business documents and an agglomeration of the legal and business documents in whole, and outputting a binary tree structure recording a nested sequence of pairwise joints determined from the document similarity operation, wherein a level zero of a hierarchal cluster formed of the clustering is used for deriving predicates synonymy, and wherein the level zero is used to treat elements of same clusters unitary by use of a cluster representative;

an executable portion that receives input from a user querying a probability as to whether defined casual factors specified in the input are directly or indirectly a cause of the one or more reoccurring problems, wherein, responsive to receiving the input, a problem-resolution pair is created using semantics in the input providing new information about activities previously undertaken to solve the one or more reoccurring problems, and wherein the problem-resolution pair correspond to the at least some of the relationship dependencies and the weights associated with the at least some of the relationship dependencies;

an executable portion that automatically identifies a root cause and one or more causal factors of the one or more reoccurring problems using the logical representation and the input such that the identifying associates a confidence level for the root cause and the one or more causal factors; and an executable portion that uses natural language processing (NLP) to provide logical form evidence for identifying the root cause between the one or more reoccurring problems and the logical representation such that the logical form evidence is presented to a user in a form of logic-based NLP statements, including, when the one or more reoccurring problems are legally-based, an identification as to which of the one or more casual factors recursively contribute to an infringement of one of the legal regulations governing the particular organization and an explanation of causation thereof.

12. The computer program product of claim 11, further including an executable portion that compresses the text data upon processing the text data using a lexical analysis, extraction of concepts, semantic analysis, or a combination thereof.

13. The computer program product of claim 11, further including an executable portion that converts the text data into a first order probabilistic logical (PL) representation of the knowledge domain.

14. The computer program product of claim 11, further including an executable portion that infers the one or more causal factors with each of the one or more reoccurring problems identified in the text data and a solution provided in the ontology.

15. The computer program product of claim 11, further including an executable portion that uses the NLP to provide the logical form evidence used for identifying the one or more causal factors between the one or more reoccurring problems and the logical representation.

* * * * *